(12) United States Patent
Abernethy, Jr. et al.

(10) Patent No.: US 8,156,497 B2
(45) Date of Patent: *Apr. 10, 2012

(54) PROVIDING SHARED TASKS AMONGST A PLURALITY OF INDIVIDUALS

(75) Inventors: Michael N. Abernethy, Jr., Pflugerville, TX (US); Kulvir S. Bhogal, Forth Worth, TX (US); Travis M. Grigsby, Austin, TX (US); Alexandre Polozoff, Bloomington, IL (US)

(73) Assignee: International Business Machines Corporation, Armonk, NY (US)

( * ) Notice: Subject to any disclaimer, the term of this patent is extended or adjusted under 35 U.S.C. 154(b) by 295 days.

This patent is subject to a terminal disclaimer.

(21) Appl. No.: 12/128,876

(22) Filed: May 29, 2008

(65) Prior Publication Data

US 2008/0235324 A1    Sep. 25, 2008

Related U.S. Application Data

(63) Continuation of application No. 11/360,871, filed on Feb. 23, 2006.

(51) Int. Cl.
*G06F 9/46* (2006.01)
(52) U.S. Cl. ...................................................... 718/102
(58) Field of Classification Search .................. 718/106, 718/102
See application file for complete search history.

(56) References Cited

U.S. PATENT DOCUMENTS

| | | | | |
|---|---|---|---|---|
| 5,530,861 | A * | 6/1996 | Diamant et al. | 705/8 |
| 5,701,482 | A * | 12/1997 | Harrison et al. | 718/105 |
| 5,790,850 | A * | 8/1998 | Natu | 713/2 |
| 7,277,952 | B2 * | 10/2007 | Nishanov et al. | 709/229 |
| 2002/0016811 | A1 * | 2/2002 | Gall et al. | 709/102 |
| 2003/0092454 | A1 * | 5/2003 | Halim et al. | 455/466 |
| 2003/0135565 | A1 | 7/2003 | Estrada | |
| 2004/0192329 | A1 | 9/2004 | Barbosa et al. | |
| 2005/0268300 | A1 * | 12/2005 | Lamb et al. | 718/100 |
| 2006/0020911 | A1 * | 1/2006 | Lyons | 717/101 |
| 2007/0109592 | A1 * | 5/2007 | Parvathaneni et al. | 358/1.15 |

OTHER PUBLICATIONS

Office Action mail Jun. 8, 2010 for U.S. Appl. No. 11/360,871; 17 pages.

\* cited by examiner

*Primary Examiner* — Jennifer To
*Assistant Examiner* — Blake Kumabe
(74) *Attorney, Agent, or Firm* — Stephen R. Tkacs; Stephen J. Walder, Jr.; David A. Mims, Jr.

(57) ABSTRACT

A mechanism for sharing tasks is provided in which individuals in a share group may signal their intent to complete individual shared tasks and communicate that intent to other individuals in the share group. A required time for completion of the shared tasks may be associated with an individual's signaling of the intent to complete the shared task. The completion of the shared task by the individual signaling intent to complete may be monitored and, if not completed within the associated required time, the performance of the shared task may again be shared with the individuals of the share group. In this way, another individual may signal that individual's intent to perform the shared task and the process may be repeated until the shared task is completed.

17 Claims, 6 Drawing Sheets

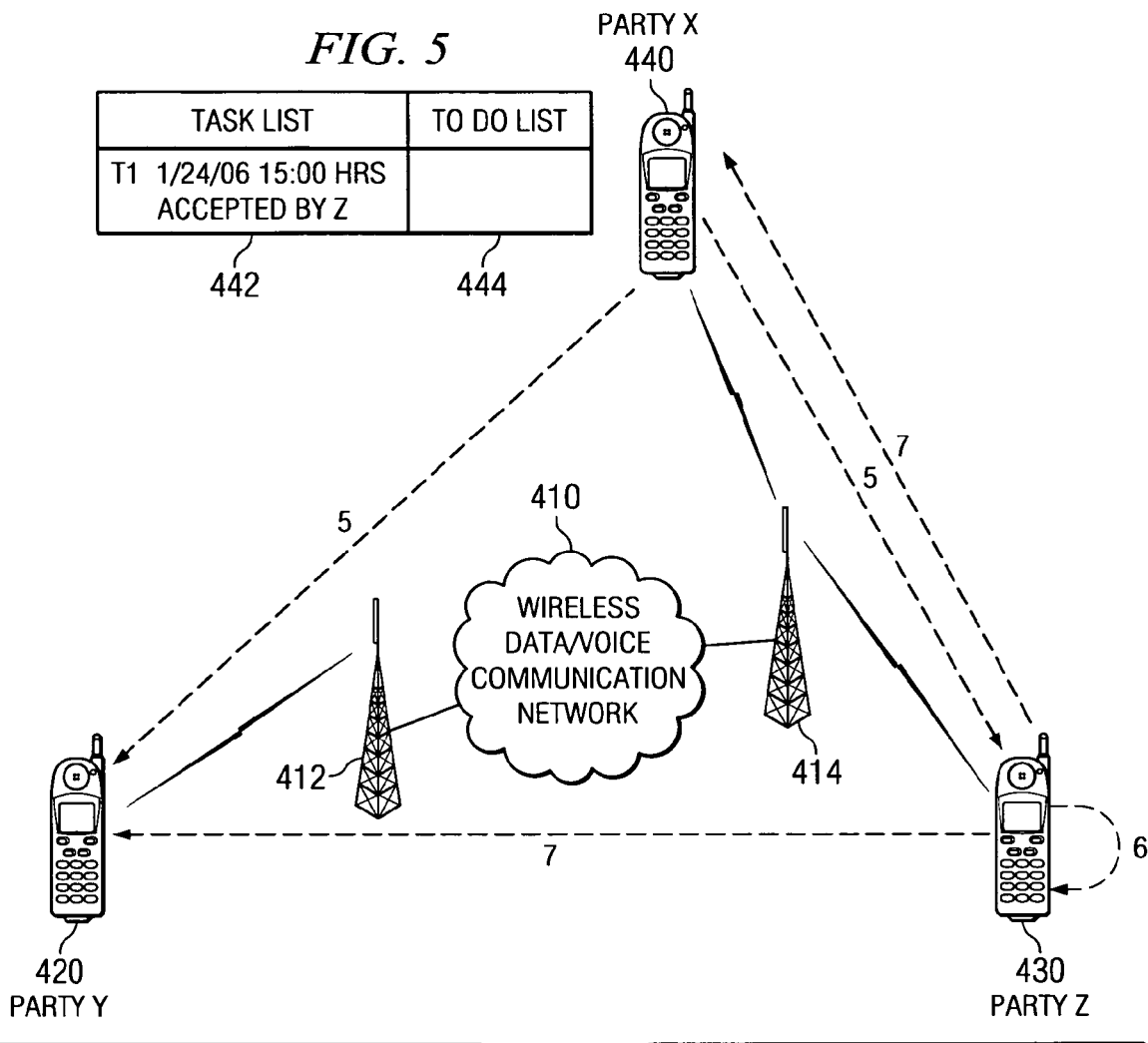

PROVIDING SHARED TASKS AMONGST A PLURALITY OF INDIVIDUALS

This application is a continuation of application Ser. No. 11/360,871, filed Feb. 23, 2006, status pending.

BACKGROUND

1. Technical Field

The present application relates generally to an improved data processing system and method. More specifically, the present application is directed to a system and method for providing shared tasks amongst a plurality of individuals.

2. Description of Related Art

The ability to share tasks amongst a plurality of users via a plurality of computing devices is generally known in the art. For example, U.S. Pat. No. 5,530,861 issued to Diamant et al., entitled "Process Enaction and Tool Integration Via a Task Oriented Paradigm," describes a system in which group work is supported by sharing tasks between individuals while keeping changes synchronized between them. Mechanisms, such as that described in U.S. Pat. No. 5,530,861, recognize that there are often times multiple parties that can complete a task and once one does, other individuals do not need to complete the same task.

Thus, known mechanisms such as that described in U.S. Pat. No. 5,530,861 provide the ability to share tasks and synchronize changes to the tasks so as to inform others in the group to which the tasks are shared that a particular task has been completed. However, there is no ability in the known mechanisms for individuals in the share group to indicate their intent to complete tasks or to monitor whether such intent is fulfilled within a required time period.

SUMMARY

The illustrative embodiments provide a system, method, and computer program product for sharing tasks amongst a plurality of individuals in a share group. More specifically, the illustrative embodiments provide a mechanism for sharing tasks in which individuals in the share group may signal their intent to complete individual shared tasks and communicate that intent to other individuals in the share group. Moreover, a required time for completion of the shared tasks may be associated with the individual's signaling of the intent to complete the shared task. The completion of the shared task by the individual signaling intent to complete may be monitored and, if not completed within the associated required time, the performance of the shared task may again be shared with the individuals of the share group. In this way, another individual may signal his/her intent to perform the shared task and the process may be repeated until the shared task is completed.

In addition to the above, logic may be provided for varying the required time period associated with a signaled intent to complete based on various characteristics of the shared task. For example, if the shared task has been previously the subject of an intent to complete signal from an individual in the share group, then the required time period may be shortened so as to promote completion of the shared task sooner due to the delay from the previous individual. Moreover, if other tasks are determined to be dependent upon the completion of the shared task, then the required time period may likewise be shortened so as to promote the shared task being completed sooner. This adjustment of the required time periods may be performed with each iteration of the shared task being associated with a signaled intent to complete.

Moreover, the illustrative embodiments may provide a mechanism for an individual to assume a task from another individual that has already signaled his/her intent to complete the task. That is, if a first individual wants to complete a task that has already been associated with a second individual via the second individual's signaling of an intent to complete the task, then a message may be sent to the second individual requesting that they relinquish the intent to complete the task. If the second individual relinquishes the task, the first individual may then signal his/her intent to complete the task.

In addition, the illustrative embodiments may provide a mechanism for locking out individuals from signaling an intent to complete a task. For example, if an individual has previously signaled an intent to complete a task and then fails to complete the task, the individual may be locked out of further signaling of intent to complete that task. Whether or not locking out is applied to a particular task may be determined by established policies. Such policies may specify such locking out to be applicable to a share group, a specific category of tasks, or any other granularity of task definition.

In one illustrative embodiment, a method, in a data processing system, of sharing tasks between a plurality of individuals in a share group is provided. The method may comprise receiving a task message distributed to computing devices associated with the plurality of individuals, wherein the task message identifies a task to be shared between the plurality of individuals. The method may further comprise outputting an indicator of the task to a user of the data processing system requesting whether the user wishes to accept the task. The method may also comprise generating an acceptance message in response to the user accepting the task, wherein the acceptance message indicates the user's intent to complete the task, and distributing the acceptance message to computing devices associated with each of the plurality of individuals.

The task message may be a short message service (SMS) message that includes a sentinel sequence for specifying that the task message is to be processed by a task monitor process on each of the computing devices associated with individuals in the share group. Furthermore, the method may be implemented by a server computing device that communicates with computing devices associated with the plurality of individuals in the share group.

Moreover, the method may comprise generating a task data structure for the task, identifying the share group comprising the plurality of individuals with which the task data structure is to be shared, and distributing the task data structure in association with the task message to the computing devices associated with individuals in the identified share group. Generating a task data structure may comprise specifying at least one of task requirements, a description of the task to be performed, a category type for the task, required or preferred skills for individuals accepting the task, security levels of individuals that may accept the task, parent tasks associated with the task, child tasks associated with the task, a required completion time for the task, or a preferred completion time interval.

The method may further comprise maintaining a current task list having task entries for tasks created by the user of the data processing system or shared with the user of the data processing system. Each task entry in the current task list may have a unique identifier.

The method may further comprise calculating a completion time interval value specifying a completion time interval in which the task should be completed by the user in response to the user generating the acceptance message, associating the completion time interval value with a task entry in a to do list data structure maintained by the data processing system, and monitoring the to do list data structure to determine if the task is completed within the calculated completion time interval. Calculating the completion time interval value may comprise calculating the completion time interval value based on at least one of a preferred completion time interval value specified by a creator of the task, a default completion time interval value, whether the task has dependent tasks, or whether the task has been previously accepted for completion but was not completed.

Moreover, the method may comprise releasing the task back to the share group, wherein another individual in the share group may accept the task in response to the task not being completed within the associated completion time interval. A task update message may be distributed to the computing devices associated with each of the individuals in the share group indicating that the task was not completed within the completion time interval and is available to be accepted.

The method may further comprise receiving a request from a computing device associated with an individual in the share group requesting that the user of the data processing system relinquish the task. The task may be relinquished back to the share group such that any individual in the share group may accept the task for completion.

The method may also comprise receiving a user input indicating that the task has been completed. A completion message may be distributed to the computing devices associated with the individuals in the share group. In response to receiving the completion message, the computing devices may remove the task from their respective task list data structures.

In another illustrative embodiment, a computer program product comprising a computer useable medium having a computer readable program is provided. The computer readable program, when executed on a data processing system, causes the data processing system to perform the various operations described above with regard to the method illustrative embodiment.

In yet another illustrative embodiment, an apparatus for sharing tasks between a plurality of individuals in a share group is provided. The apparatus may comprise a processor and a memory coupled to the processor. The memory may comprise instructions which, when executed by the processor, cause the processor to perform the various operations described above with regard to the method illustrative embodiment.

These and other features and advantages of the present invention will be described in, or will become apparent to those of ordinary skill in the art in view of the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is an exemplary diagram illustrating an operation for determining a failure to complete a shared tasks and re-sharing the task with a share group in accordance with one illustrative embodiment;

DETAILED DESCRIPTION OF THE PREFERRED EMBODIMENTS

Figure 1:
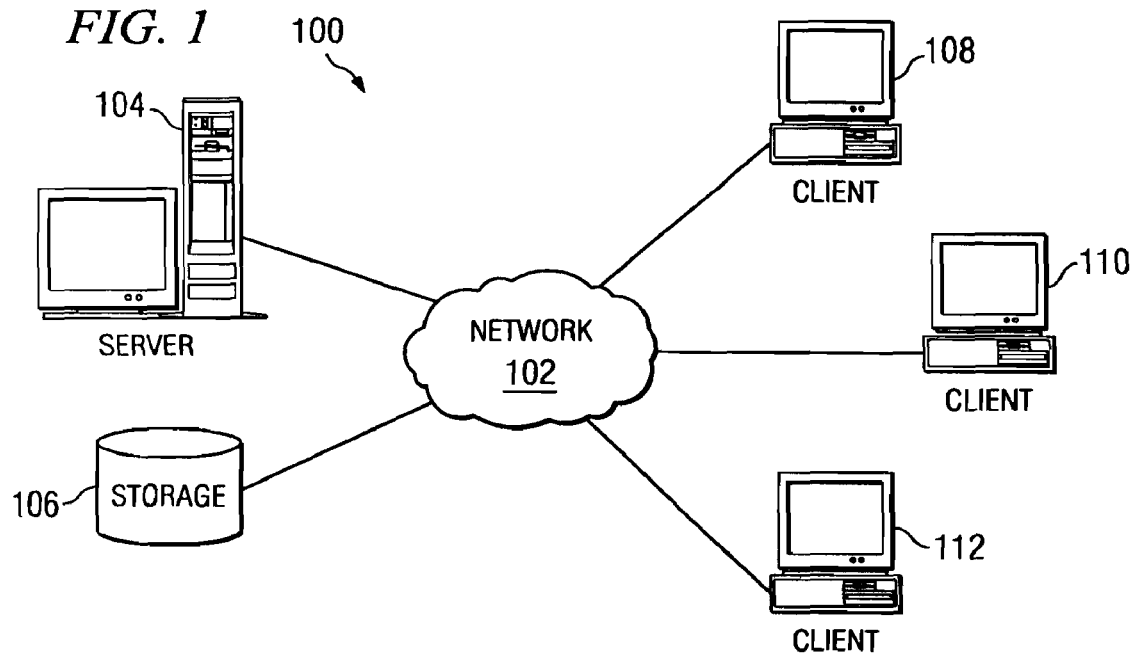
FIG. 1 is an exemplary diagram illustrating a distributed data processing environment in which the illustrative embodiments may be implemented.
Figure 2:
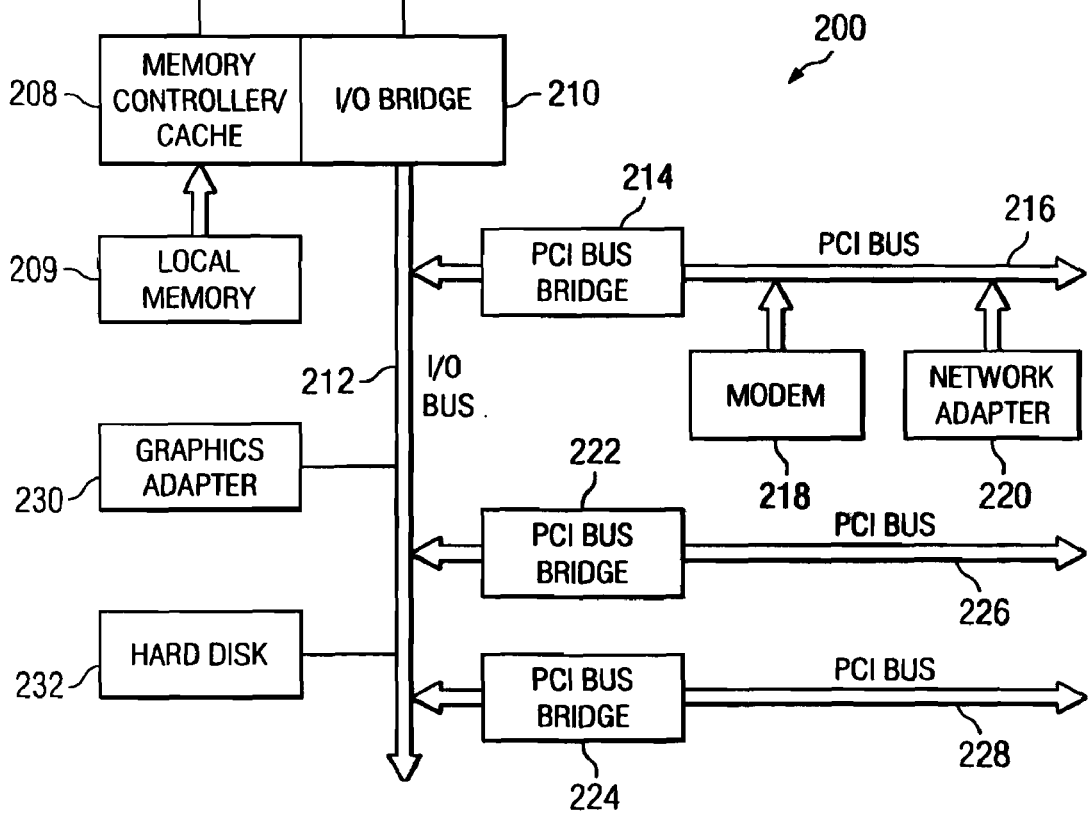
FIG. 2 is an exemplary block diagram of a server computing device in which aspects of the illustrative embodiments may be implemented.
Figure 3:
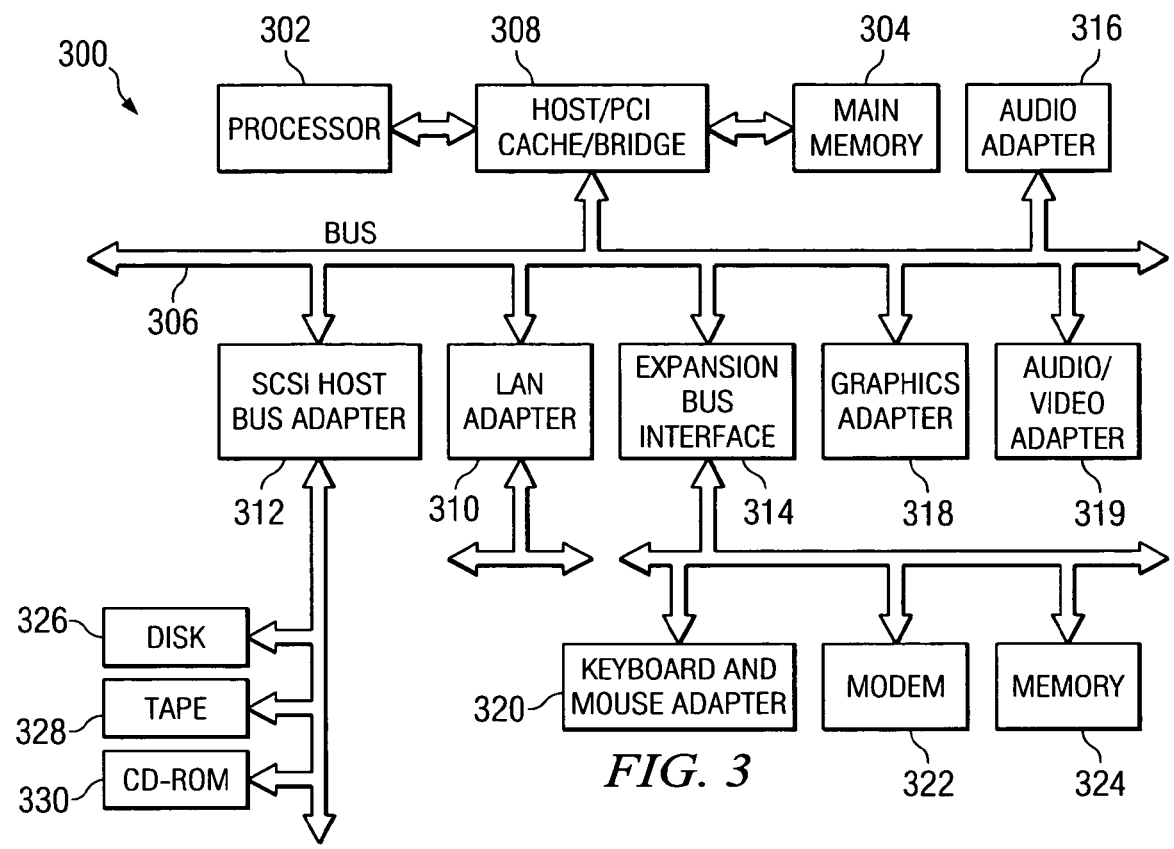
FIG. 3 is an exemplary block diagram of a client computing device in which aspects of the illustrative embodiments may be implemented.

As discussed above, the illustrative embodiments provide mechanisms for sharing tasks amongst a plurality of individuals in a share group so as to efficiently handle the performance of tasks. As such, the illustrative embodiments are especially well suited for a distributed data processing environment in which tasks are shared amongst individuals using a plurality of different computing devices that communicate with one another via one or more data networks. FIGS. 1-3 hereafter are provided as examples of data processing devices and data processing environments in which exemplary aspects of the illustrative embodiments may be implemented. FIGS. 1-3 are only exemplary and are not intended to state or imply any limitation with regard to the particular data processing devices and environments in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data. Moreover, data processing system 300 may be, or be part of, a portable communication device, such as a wireless telephone device, or the like.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Referring again to FIG. 1, it may be desirable to share tasks amongst a plurality of individuals in order to ensure efficient performance of the tasks utilizing the various talents and skills of the individuals. In order to share tasks amongst individuals, electronic task items, i.e. task data structures, are generated and distributed to a select plurality of the client devices 108-112, the plurality being part of a selected share group. The generation and distribution of such electronic task items may be performed via a daemon process executing on each of the client devices 108-112. Alternatively, the generation and distribution of such electronic tasks may be performed from a central location, such as a centralized server, e.g., server 104, which runs one or more applications for generation, distribution, and monitoring of shared tasks.

For purposes of the following description, it will be assumed that the electronic task items are generated, distributed, and monitored in a distributed manner by each of the select plurality of client devices 108-112 rather than from a centralized server. Thus, the mechanisms of the illustrative embodiments provide a daemon process that runs on each of the client devices 108-112 that contains logic for generating tasks, distributing tasks, and monitoring for acceptance and completion of tasks by individuals to which the tasks were distributed. A user of a first client device may generate a task and specify a share group with which to distribute the task, i.e. may designate the network address, electronic mail address, or other contact information for the individuals to which the task is to be distributed. The generation of the task may involve the setting of task requirements, a description of the task to be performed, a category type for the task, required or preferred skills, security levels, or other characteristics of the individuals that should perform the task, and the like. Any elements of a task that may be used to define the task and the individuals that should perform the task may be used without departing from the spirit and scope of the present invention.

The task may be part of a set of tasks that may or may not have a hierarchical arrangement indicating dependencies of tasks to be performed to complete a particular project. Thus, the definition of the task may designate parent and child tasks in the hierarchical arrangement, if any. Identifiers of such parental and child tasks may be included in the description of the task and may be used, as described hereafter, to influence the time periods for performing the task.

The user may further designate a required completion time for the task and optionally, a completion time interval to be associated with the task once another individual in the share group agrees to perform the task, i.e. signals his/her intent to complete the task. Alternatively, a default completion time interval may be associated with the task in response to an individual agreeing to perform the task. For example, a user may designate that a particular task has a required completion time of Jan. 10, 2006 at 17:00 hours and a completion time interval to be associated with the task once accepted by an individual of 2 hours. Thus, once an individual signals his/her intent to complete the task, they have 2 hours to complete the task or the task will be released for others in the share group to accept the task for performance.

Each client device 108-112 maintains a current task list for that client device 108-112. The current task list represents those tasks that are either generated by that client device 108-112 or that were shared with that client device 108-112. Once a task is generated by the client device 108-112 or received by the client device 108-112, it is added to this task list. Each task has a unique identifier. For example, the unique identifier for a task may be a timestamp of when the task was created plus a random sequence of numbers/characters.

After generating the task, the user may specify the individuals to which the task is to be shared. The user may specify each individual by entering or selecting the individual's contact information from a data structure storing the individual's contact information. For example, the user may select the individual from his/her "Contacts" in the Microsoft Outlook™ electronic mail application. Alternatively, a separate data structure used exclusively by the daemon processes of the illustrative embodiments may be utilized to store such contact information.

Based on the selection of the individuals to which the task is to be shared, messages are sent to the addresses associated with these individuals to indicate the intent to share the task with these individuals. For example, in a preferred embodiment, a short message service (SMS) message may be sent to the individuals' computing devices based on the addresses either input by the user or associated with the contact information selected by the users. The individuals with whom the task is to be shared, as designated by the user, constitute a share group.

It should be noted that rather than specifying each individual to which the task is to be shared, the user may select groups of individuals that have been predefined. Thus, for example, there may be predefined groups of individuals based on a business' organization and the user may select one of these groups with which to share the task. Similarly, a share group may have been established in a previous sharing of a task and this share group may be selected by the user rather than re-specifying each individual to be included in the share group.

The SMS message may include sentinel sequence at the beginning of the message, e.g., @@TASK@@, to indicate that the SMS message is meant to be processed by the daemon application running on the client devices 108-112 that receive the SMS message. The SMS message may further include text generated based on the generated task that describes the task that is being shared.

In response to receiving a SMS message with such a sentinel sequence, the client device 108-112 processes the SMS message by parsing the message to extract the various characteristics of the shared task. Based on the extracted characteristics of the shared task, the client device 108-112 adds the shared task to the task list for that client device 108-112. The entry in the task list may include the details of the task in various fields of the task list as well as identifiers of the share group or the individuals in the share group. The entry in the task list may be indexed by the unique identifier for the tasks.

In addition, the client device 108-112 may display or otherwise output an indicator of the receipt of a new task. This display or output may provide details of the task to be performed and may request that a user of the client device 108-112 indicate whether he/she will accept this task for performance. If the user indicates that he/she will perform the task, then the task may be added to a "to do" list data structure associated with the client device 108-112. In addition, an SMS message may be sent to the other client devices 108-112 of individuals in the share group indicating that a particular individual has accepted the task for performance, i.e. signaled his/her intent to complete the task.

In response to a user of a client device 108-112 accepting the task, a completion time interval may be calculated and associated with the task in the client devices' "to do" list data structure. The calculation of the completion time interval may be as simple as applying a desired completion time interval as specified by the creator of the task and designated in the task message or a default completion time interval used by the daemon processes. Alternatively, as will be discussed in greater detail hereafter, a more complex determination of the completion time interval may be made based on a desired complete time interval, whether the task has dependent tasks, whether the task has been previously accepted for performance but has not been completed, and/or other factors.

Once an individual performs the task, the individual may select the task in a user interface representation of the "to do" list data structure and designate the task as having been completed. In response to the user designating the task as having been completed, the task may be deleted from the "to do" list data structure and the task list data structure. Prior to deleting the task from the task list data structure, a SMS message may be sent to the other client devices of individuals in the share group indicating completion of the task so that the task may be removed from their task list data structures as well.

When an individual signals his/her intent to complete a task and thus, accepts performance of the task, other individuals in the share group cannot accept performance of the task until that individual either does not complete the task within the determined completion time interval or the individual releases the task. In addition to providing a mechanism for the individual to indicate the task as being complete using the "to do" list data structure, the mechanisms of the illustrative embodiments may further provide an ability for the individual to relinquish the task back to the share group at which time a relinquish message may be distributed to the devices associated with the other individuals in the share group.

The ability to relinquish a task is helpful when one individual wishes to complete a task while the task is currently assigned to another individual in the share group. For example, if a first individual wants to complete a task that has already been associated with a second individual via the second individual's signaling of an intent to complete the task, then a message may be sent to the second individual requesting that the second individual relinquish the intent to complete the task. If the second individual relinquishes the task, the first individual may then signal his/her intent to complete the task. This promotes completion of the task at an earliest possible time assuming that the first individual will complete the task at an earlier time than the second individual. Furthermore, in this way, if there are multiple individuals or parties that may complete a task, any of these individuals or parties may complete the task even though the task is only assigned to one individual or party at a time.

When the task is relinquished and accepted by another individual, the completion time interval for the task may or may not be reset. In one illustrative embodiment, the completion time interval is not reset so as to promote completion of the task as soon as possible. In another illustrative embodiment, the completion time interval is recalculated and the amount of remaining time in the completion time interval from the previous acceptance of the task is used in determining the new completion time interval when the task is relinquished back to the share group. This remaining time in the completion time interval may be used to shorten the newly calculated completion time interval.

It should be noted that there is the possibility that one individual may complete the task even though the task is currently assigned to a different individual in the share group. The occurrence of this situation is minimized by the ability to request relinquishing of a previously accepted task as discussed above. However, this situation may still arise.

In the above situation in which one individual completes the task even though the task is currently assigned to a different individual, there are two possible solutions that may be implemented using the mechanisms of the illustrative embodiments. With a first solution for handling the above situation, the individual that completes the task may signal completion of the task even if the task is currently assigned to another individual. In this case, the signaling of an intent to complete is an information-only state that does no real enforcement.

In a second solution for handling the above situation, the individual that completed the task cannot mark the task as having been completed because the task is current assigned to another individual in the share group as a result of the other individual's signaling of an intent to complete the task. Rather, the first individual may signal the second individual to which the task is currently assigned to inform the second individual of the completion of the task and that it need not be performed. The second individual to which the task is currently assigned may then mark the task as having been completed. Alternatively, the first individual may use the request for relinquishment as discussed above to have the second individual relinquish the task and then the first individual may accept the task and immediately mark it as having been completed.

As mentioned above, each task has an associated required completion time and may have an associated completion time interval associated with accepted tasks. Thus, the daemon processes on the client devices 108-112 either continuously or periodically monitor the tasks in the task list data structure and the "to do" list data structures to determine if the required completion time or the completion time interval have elapsed. If the required completion time has elapsed, then the task may be removed from the task list data structure and an appropriate notification may be provided to the creator of the task and optionally the other individuals in the share group that the task was not completed by the required completion time.

If the completion time interval associated with an accepted task elapses, then the task may be released for acceptance by another individual in the share group. A SMS message may be sent to the other client devices of individuals in the share group indicating that the task is no longer accepted by the individual that previously accepted the task and is available for acceptance by another individual in the share group. Moreover, the individual that previously accepted the task but did not complete the task within the completion time interval may be locked out, by the daemon process, from accepting the task again.

Whether or not locking out is applied to a particular task may be determined by established policies. Such policies may specify such locking out to be applicable to a share group, a specific category of tasks, or any other granularity of task definition. In a further example, the daemon process of the illustrative embodiments may maintain a history of the times that a particular individual in the share group has accepted tasks and not completed them within the completion time interval. If this number of times exceeds some predetermined threshold, then the locking out mechanism of the illustrative embodiments may be initiated for this particular individual. Other mechanisms and policies for determining whether or not to lock out an individual in a share group from accepting a task for completion after having previously accepted the task may be used without departing from the spirit and scope of the present invention.

After the task is released back to the share group, if another individual in the share group accepts the task for performance, another SMS message may be distributed to the share group to inform the individuals of the share group that the task has again been accepted. A new completion time interval is then calculated for this new acceptance of the task and stored along with the task identifier and description in the "to do" list data structure of the client device 108-112 of the individual that accepted the task.

The new completion time interval may be calculated based on a number of characteristics of the task including the required completion time, the completion time interval specified for the task by the creator the task, a default completion time interval used by the daemon processes, whether or not the task has been previously accepted and not completed within the completion time interval, whether the task has dependent tasks, and the like. For example, the required completion time and the completion time interval specified for the task, or the default completion time interval, may be used to calculate a first completion time interval. In one illustrative embodiment, for example, the first completion time interval may be the lesser of the specified or default completion time interval and the difference between a current time and the required completion time.

This first completion time may then be adjusted based on other criteria such as those stated above. That is, for example, if the task has been previously accepted and not performed within the previous completion time interval, the present completion time interval may be shortened so as to promote completion of the task sooner. Similarly, if the task has dependent tasks that rely on the completion of the current task, then the completion time interval may be shortened so as to promote completion of the task sooner so that the dependent tasks are not unnecessarily delayed. Other factors for adjusting the completion time interval may be used without departing from the spirit and scope of the present invention.

Figure 4:
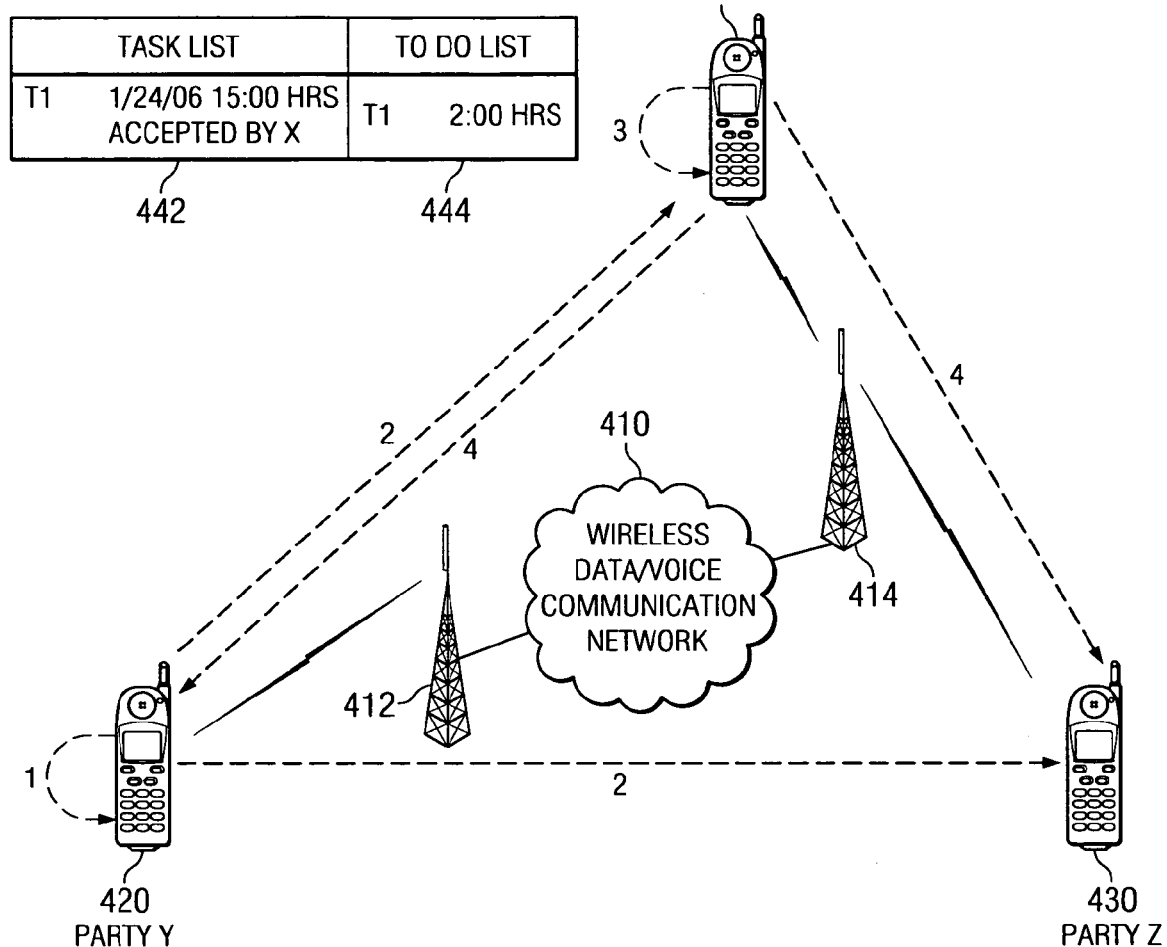
FIG. 4 is an exemplary diagram illustrating an operation for sharing tasks amongst a plurality of individuals in a share group in accordance with one illustrative embodiment.

FIG. 4 is an exemplary diagram illustrating an operation for sharing tasks amongst a plurality of individuals in a share group in accordance with one illustrative embodiment. As shown in FIG. 4, three client devices 420, 430 and 440 are in communication with one other via the wireless data/voice communication network 410. In this depicted example, the client devices 420, 430 and 440 are wireless communication devices, such as wireless telephones, that each have a shared task monitor mechanism operating on the client devices. The client devices 420, 430 and 440 communicate via the wireless data/voice communication network 410 through wireless access points, e.g., base stations, 412 and 414. With regard to the illustrative embodiments, the client devices 420, 430 and 440 exchange SMS messages via the wireless access points 412, 414 and wireless data/voice communication network 410 to thereby share tasks between the users of the client devices 420, 430 and 440.

The shared task monitor mechanisms present in the client devices 420, 430 and 440 maintain task list and to do list data structures 422, 424, 432, 434, 442 and 444 for tracking the sharing and performance of tasks amongst the users of the client devices 420, 430 and 440, i.e. parties X, Y and Z. The task list data structures 422, 432 and 442 have entries for each task identifying the task, the details of the task, required times of completion, and other characteristics of the tasks obtained from task SMS messages received by the corresponding client device 420, 430 and 440 or obtained from the electronic task item generated by the user of the client device 420, 430 and 440. For purposes of brevity, only the task identifier and corresponding required completion time are shown in FIG. 4.

The to do list data structures 424, 434 and 444 have entries for tasks that have been accepted by the user of the corresponding client device 420, 430 and 440, as well as other "to do" items that the user may have added to their own to do list data structure, if any. Task entries in the to do list data structure store the identifier of the task as well as a completion time interval value indicating a time interval in which the task must be completed before the task is released to the share group so that someone else may accept the task for performance. This completion time interval may be used with the timestamp associated with the acceptance of the task and a current time to determine whether the task has been completed within the specified completion time interval.

As shown in FIG. 4, the sharing of tasks amongst users of the client devices 420, 430 and 440 begins with the creation of a task T1 and the specifying of the share group with which the task T1 is to be shared. As mentioned above, the creation of the task T1 may involve specifying a description of the task, required time for completion of the task, any parent and/or child tasks associated with this task, skill requirements for individuals accepting the task, and other characteristics of the task. The identification of the share group may be done by the creator of the task entering appropriate contact information for other individuals' client devices with which the task is to be shared, selecting individuals from a contact data structure, selection of a pre-established share group from a contact data structure, or the like.

Having generated the task and specified who the task is to be shared with, the client device associated with the creator of the task, e.g., client device 420, adds the task to its own task list data structure 422 and sends an SMS message to the other client devices 430 and 440 in the share group. The share task monitors on the other client devices 430 and 440 receive the SMS message, recognize it as being a task message, such as based on sentinel text in a header of the SMS message, and add the task to their own task list data structures 432 and 442. In addition, the client devices 430 and 440 may display or otherwise output an indication to their users, i.e. parties X and Z, that a new shared task has been received and requesting whether the user wishes to accept or decline performance of the task.

If the user decides to accept performance of the task, then the task list data structure entry is updated to reflect acceptance of the task on the corresponding client device, e.g., client device 440 in the depicted example. A completion time interval for the task is calculated based on a desired time interval provided with the task or a default time interval, if any, whether or not the task has been previously accepted and not completed, whether there are dependent tasks, and/or other criteria. The task is then added to the client device 440's to do list data structure 444 with the calculated completion time interval.

A SMS message is sent to each of the other client devices 420 and 430 of the share group informing them of the acceptance of the task by party X. The entries in the task list data structures 422 and 432 are then updated to indicate that the task has been accepted by party X. As a result, the users of client devices 422 and 432 may not accept the task for completion.

FIG. 5 is an exemplary diagram illustrating an operation for determining a failure to complete a shared task and re-sharing the task with a share group in accordance with one illustrative embodiment. The shared task monitor on the client devices 420, 430 and 440 may continuously or periodically check entries of their to do list data structures 424, 434 and 444 to determine if any of the tasks have expired without being completed. A user of a client device 420, 430 or 440 may indicate completion of the task by accessing the to do list data structure 424, 434 or 444 using a user interface provided by the client device 420, 430 or 440, selecting the task T1, and choosing an option to specify the task as having been completed, for example.

In the depicted case, it is assumed that party X did not indicate completion of the task T1 within the 2 hour completion time interval of acceptance of the task T1. In response to detection of the expiration of the completion time interval for task T1 in the to do list data structure 444, the shared task monitor of client device 440 sends an SMS message to the other client devices 420 and 430 of the share group indicating that the task was not completed and is again available for acceptance by another party in the share group. In addition, the shared task monitor may add the task to a non-acceptance data structure maintained by the shared task monitor that is checked when the user of client device 440 attempts to accept tasks. This non-acceptance data structure may list those tasks that were accepted by the user, i.e. party X, but were not completed and thus, cannot be accepted by the user again. Alternatively, the task may simply be removed from the task list data structure 442 for the client device 440 thereby making it impossible for the user of client device 440 to accept the task for performance.

In response to receiving the SMS message indicating that task T1 was not completed within the completion time interval, the client devices 420 and 430 may display or otherwise output a message to their users indicating that the task is available to be accepted and requesting that the user indicate acceptance of declining of the task. In the depicted example, it is assumed that in this instance, the user of client device 430, i.e. party Z, accepts the task for performance. Again, a SMS message is sent to the other client devices 420 and 440 of the share group indicating that party Z has accepted the task. The task list data structures 422 and 442 are updated appropriately as previously described.

In addition, the shared task monitor of client device 430 calculates a new completion time interval for the task using similar parameters as described above. In this case, since the task has been previously accepted and not completed, and thus, the performance of the task has been delayed, the calculated completion time interval is less than the previously calculated completion time interval for client device 440. This shortened completion time interval is used as a means for promoting performance of the task quicker so that completion by the required completion time is assured.

The above process may be repeated as the task is accepted and not completed until the task is eventually completed or until the required completion time expires. If the task is completed within a calculated completion time interval, this completion is communicated to the other client devices 420, 440 in the share group using a SMS message. In response, the client devices 420, 430 and 440 remove the task from their task list and to do list data structures.

The shared task monitors of the client devices 420, 430 and 440 may continuously or periodically check the task list data structure to determine if any tasks have not been completed by their required completion times. If the task is not completed within the required completion time, a message may be output to the creator of the task indicating that the task was not completed. The task may then be removed from the task list and to do list data structures 422 and 424 of the client device 420 of the creator of the task. SMS messages may be sent from the client device 420 of the creator of the task to the other client devices, e.g., client devices 430 and 440, of the share group indicating that the task should be removed from their task list and to do list data structures.

Other than the functions described above that require user interaction with the shared task monitor, the functions of the shared task monitor may be performed in a background, such as with a daemon process. In this way, the operations of the illustrative embodiments are performed without having to be perceived by the user. This minimizes interruption of the user's use of the client devices 420, 430 and 440. In an alternative embodiment, the shared task monitor may run in the foreground on a periodic basis, for example.

Figure 6:
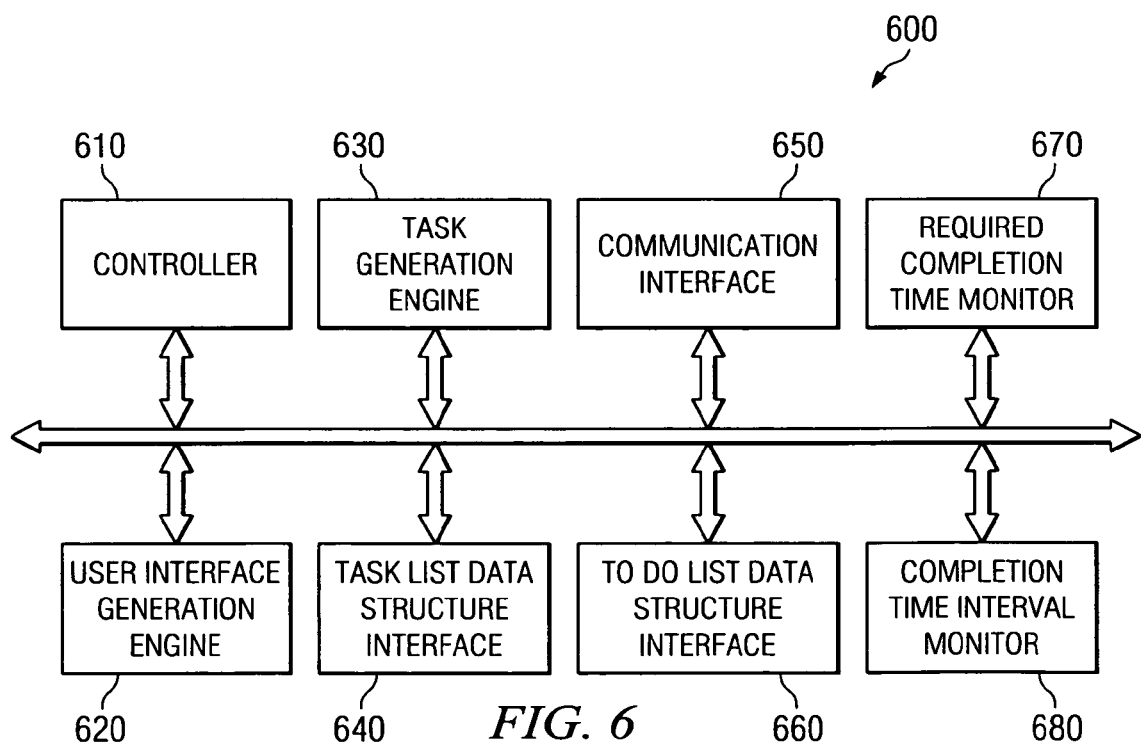
FIG. 6 is an exemplary block diagram of a shared task monitor in accordance with an illustrative embodiment.

FIG. 6 is an exemplary block diagram of a shared task monitor in accordance with an illustrative embodiment. As shown in FIG. 6, the shared task monitor 600 includes a controller 610, a user interface generation engine 620, a task generation engine 630, a task list data structure interface 640, a communication interface 650, a to do list data structure interface 660, a required completion time monitor 670, and a completion time interval monitor engine 680. The controller 610 controls the overall operation of the shared task monitor and contains the logic required to orchestrate the operation of the other elements 620-680 of the shared task monitor 600.

The user interface generation engine 620 generates the necessary user interfaces for requesting and obtaining input, such as for generation of tasks, from a user of the client device in which the shared task monitor 600 is operating. In addition, the user interface generation engine 620 generates user interfaces for notifying the user of shared tasks that have been received and may be accepted for performance by the user. Moreover, the user interface generation engine 620 generates the necessary user interfaces for accessing information in the task list data structure and/or to do list data structure so that the user may accept tasks, indicate tasks as having been completed, or otherwise just browse the tasks for the user's own information. Other user interfaces may be generated by the user interface generation engine 620 without departing from the spirit and scope of the present invention.

The task generation engine 630 performs the necessary operations for generating a task based on input from a user of the client device. The task generation engine 630 generates a task list data structure entry in a task list data structure that is accessible via the task list data structure interface 640. The task generation engine 630 further notifies the controller 610 once a task is generated so that the controller 610 may send appropriate SMS messages to other client devices in the share group associated with the task via the communication interface 650. Updates to the task list data structure may further be made via the task list data structure interface 640 based on SMS messages that are received via the communication interface 650 indicating acceptance of tasks, non-performance of tasks within a completion time interval, completion of tasks, and the like.

Tasks that are accepted by a user of the client device, via a user interface generated by the user interface generation engine 620, may be added to a to do list data structure via the to do list data structure interface 660. In so doing, the controller 610 calculates a completion time interval for the task and stores is along with other information regarding the task in the to do list data structure entry via the to do list data structure interface 660. Updates to the to do list data structure may also be made via the to do list data structure interface 660.

Two monitors, the required completion time monitor 670 and the completion time interval monitor engine 680, are provided for monitoring whether the required completion time and the completion time intervals of tasks have expired. These monitors may operate continuously or periodically, depending upon the particular implementation of the illustrative embodiment.

The required completion time monitor 670 is responsible for checking each entry in the task list data structure, via the task list data structure interface 640, to determine if its associated required completion time has expired. In addition, the required completion time monitor 670 is responsible for informing the controller 610 if the entry's required completion time has expired. If the required completion time has expired for a task, the controller 610 may instruct the user interface generation engine 620 to generate a user interface to inform the user that the task was not completed by the required completion time and the task may be removed from the task list data structure and to do list data structure.

The completion time interval monitor engine 680 is responsible for checking each entry in the to do list data structure, via the to do list data structure interface 660, to determine if its associated completion time interval has expired and informing the controller 610 if the completion time interval has expired. If a task's completion time interval has expired, the task may be removed from the to do list data structure, and optionally the task list data structure, and an appropriate message may be sent to the share group indicating the failure to complete the task within the completion time interval. The task may further be added to a non-acceptance list indicating that the task cannot be accepted again by the user of this client device.

If a task in the to do list data structure is completed, the user may indicate this completion via a user interface generated by the user interface generation engine 620. The controller 610 may then remove the task from the to do list data structure and the task list data structure and may send an appropriate message to the share group indicating completion of the task. The other client devices of the share group, having similar shared task monitors, would receive the message and their respective controllers 610 would process the message such that the task is removed from their task list and to do list data structures as well.

Figure 7:
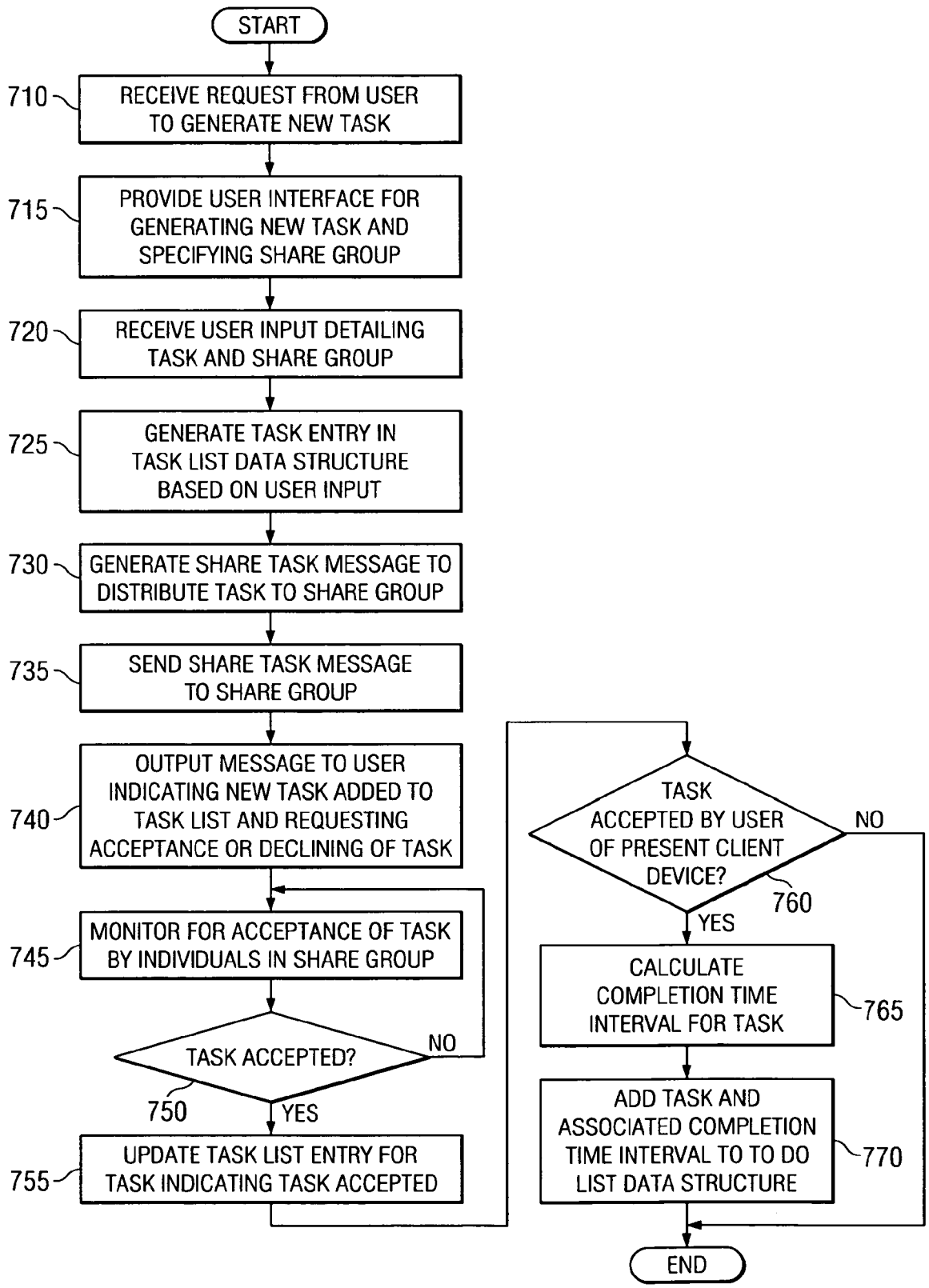
FIG. 7 is a flowchart outlining an exemplary operation for sharing a task with a share group and receiving a signal of intent to complete the shared task.
Figure 8:
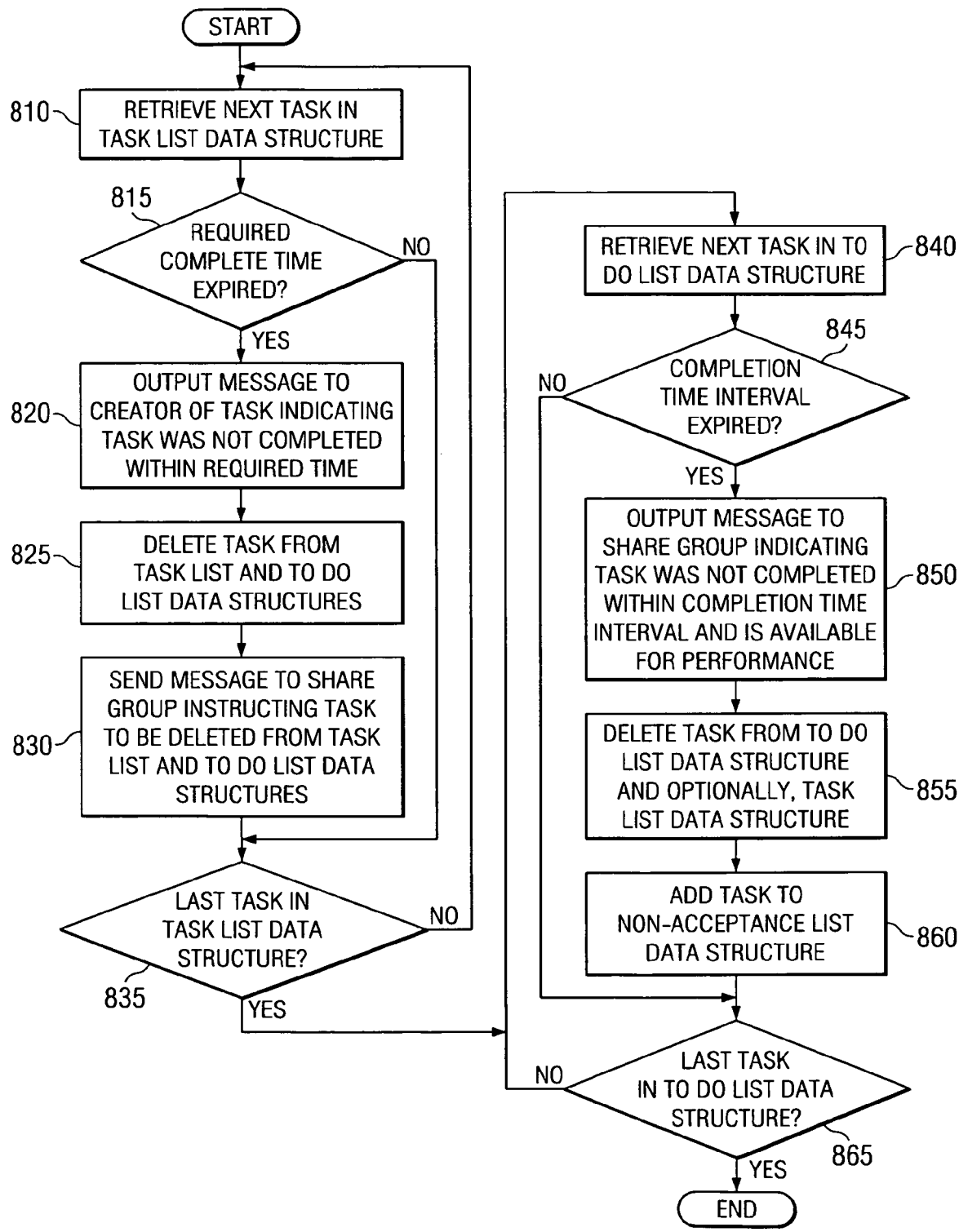
FIG. 8 is a flowchart outlining an exemplary operation for monitoring completion of a shared task and re-sharing the task with the share group in the event that the shared task is not completed as intended.

FIGS. 7 and 8 are flowcharts that illustrate exemplary operations of the illustrative embodiments. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 7 is a flowchart outlining an exemplary operation for sharing a task with a share group and receiving a signal of intent to complete the shared task. As shown in FIG. 7, the operation starts with receiving a request from a user to generate a new task (step 710). A user interface is provided to the user for generating the new task and specifying the share group (step 715). User input to the user interface is received detailing the new task and the share group (step 720).

A task entry in the task list data structure is generated based on the user's input (step 725). A share task message is generated to distribute the task to the identified share group (step 730). The share task message is sent to the share group (step 735).

It should be noted that in other client devices of the share group, rather than performing steps 710-735, the client devices would simply receive the share task message from the communication network, process the share task message, and generate a task entry in their own task list data structures based on the information contained in the share task message. Thereafter, the remaining steps of the flowchart in FIG. 7, described hereafter, would be followed.

A message is output to the user indicating that a new task has been added to the task list and requesting that the user accept or decline performance of the task (step 740). The operation then monitors for acceptance of the task by individuals in the share group (step 745). This may include monitoring for a user of the present client device inputting acceptance of the task for performance and monitoring for messages from other client devices in the share group indicating that a user of another client device has accepted the task for performance.

A determination is made as to whether the task has been accepted (step 750). If not, the operation returns to step 745 and continues to monitor for acceptance of the task. If the task has been accepted, the task list entry for the task is updated to indicate that the task has been accepted (step 755). A determination is made as to whether the task was accepted by the user of the present client device (step 760). If so, a completion time interval for the task is calculated (step 765) and the task and associated completion time interval are added to the to do list data structure of the present client device (step 770). Thereafter, or if the task was accepted by a user of a different client device, the operation terminates.

It should be appreciated that steps 745-770 may be performed independently of the generation of a new task, for example, in response to a message indicating that a task has not been performed within a completion time interval associated with the acceptance of the task. Thus, when a user accepts a task and fails to complete the task, a message is sent to the share group indicating that the task was not completed. As a result, other individuals in the share group may accept the task and the operations in steps 745-770 may be performed.

FIG. 8 is a flowchart outlining an exemplary operation for monitoring completion of a shared task and re-sharing the task with the share group in the event that the shared task is not completed as previously intended. As shown in FIG. 8, the operation starts by retrieving a next task in the task list data structure (step 810). A determination is made as to whether a required completion time for the task has expired (step 815). If so, a message is output to the creator of the task indicating that the task was not completed within the required time (step 820). The task may be deleted from the task list and to do list data structures of the client device of the creator of the task (step 825). A message is sent to the share group instructing that the task is to be deleted from the task list and to do list data structures of the client devices in the share group (step 830).

Thereafter, or if the required completion time has not expired, a determination is made as to whether this is the last task in the task list data structure (step 835). If not, the operation returns to step 810. Otherwise, if this is the last task in the task list data structure, a next task in the to do list data structure is retrieved (step 840). A determination is made as to whether the completion time interval for the task has expired (step 845).

If the completion time interval for the task has expired, a message is output to the share group indicating that the task was not completed within the completion time interval and that the task is again available for acceptance and performance by other individuals in the share group (step 850). The task is deleted from the to do list data structure and optionally, the task list data structure (step 855). The task may also be added to a non-acceptance list data structure which indicates that the user of the present client device cannot accept that task again (step 860).

Thereafter, or if the completion time interval has not expired, a determination is made as to whether this is the last task in the to do list data structure (step 865). If not, the operation returns to step 840. If this is the last task in the to do list data structure, the operation terminates. It should be appreciated that while FIG. 8 show a termination of the operation, the operation outlined in FIG. 8 may be performed continuously or periodically by the shared task monitor.

Thus, the illustrative embodiments provide a mechanism for sharing tasks amongst a plurality of individuals in a share group via their associated client devices. The illustrative embodiments allow users of client devices to indicate their intent to perform the tasks by accepting the tasks for performance. A completion time interval may be calculated based on characteristics of the task and associated with the accepted task. If the task is not performed within the completion time interval, the task may again be released to the share group so that another individual in the share group may accept and perform the task.

It should be appreciated that the illustrative embodiments may take the form of an entirely hardware embodiment, an entirely software embodiment or an embodiment containing both hardware and software elements. In a preferred embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, of sharing tasks among a plurality of individuals in a share group, comprising:
   maintaining a current task list data structure having task entries for tasks created by the user of the data processing system or shared with the user of the data processing system, wherein each task entry in the current task list data structure has a unique identifier;
   receiving, by the data processing system, a task message distributed to computing devices associated with the plurality of individuals, wherein the task message identifies a task to be shared among the plurality of individuals;
   outputting, by the data processing system, an indicator of the task to a user of the data processing system requesting whether the user wishes to accept the task;
   generating, by the data processing system, an acceptance message in response to the user accepting the task, wherein the acceptance message indicates the user's intent to complete the task;
   generating a task entry for the accepted task in the current task list data structure;
   distributing, by the data processing system, the acceptance message to computing devices associated with each of the plurality of individuals; and
   responsive to receiving a request from a computing device associated with an individual in the share group requesting that the user of the data processing system relinquish the task, relinquishing the task back to the share group such that any individual in the share group may accept the task for completion.

2. The method of claim 1, further comprising:
   identifying the share group comprising the plurality of individuals with which the task entry is to be shared; and
   distributing the task entry in association with the task message to the computing devices associated with individuals in the identified share group.

3. The method of claim 1, wherein generating the task entry comprises specifying at least one of task requirements, a description of the task to be performed, a category type for the task, required or preferred skills for individuals accepting the task, security levels of individuals that may accept the task, parent tasks associated with the task, child tasks associated with the task, a required completion time for the task, or a preferred completion time interval.

4. The method of claim 1, wherein the task message is a short message service (SMS) message that includes a sentinel sequence for specifying that the task message is to be processed by a task monitor process on each of the computing devices associated with individuals in the share group.

5. The method of claim 1, further comprising:
   receiving a user input indicating that the task has been completed; and
   distributing a completion message to the computing devices associated with the individuals in the share group, wherein in response to receiving the completion message, the computing devices remove the task from their respective task list data structures.

6. The method of claim 1, wherein the method is implemented by a server computing device that communicates with computing devices associated with the plurality of individuals in the share group.

7. A computer program product comprising a computer useable medium having a computer readable program, wherein the computer readable program, when executed on a data processing system, causes the data processing system to:
   maintain a current task list data structure having task entries for tasks created by the user of the data processing system or shared with the user of the data processing system, wherein each task entry in the current task list data structure has a unique identifier;
   receive a task message distributed to computing devices associated with the plurality of individuals, wherein the task message identifies a task to be shared among the plurality of individuals;

output an indicator of the task to a user of the data processing system requesting whether the user wishes to accept the task;

generate an acceptance message in response to the user accepting the task, wherein the acceptance message indicates the user's intent to complete the task;

generate a task entry for the accepted task in the current task list data structure;

distribute the acceptance message to computing devices associated with each of the plurality of individuals; and responsive to receiving a request from a computing device associated with an individual in the share group requesting that the user of the data processing system relinquish the task, relinquish the task back to the share group such that any individual in the share group may accept the task for completion.

8. The computer program product of claim 7, wherein the computer readable program further causes the data processing system to:

identify the share group comprising the plurality of individuals with which the task entry is to be shared; and distribute the task entry in association with the task message to the computing devices associated with individuals in the identified share group.

9. The computer program product of claim 7, wherein the task message is a short message service (SMS) message that includes a sentinel sequence for specifying that the task message is to be processed by a task monitor process on each of the computing devices associated with individuals in the share group.

10. The computer program product of claim 7, wherein the computer readable program further causes the data processing system to:

receive a user input indicating that the task has been completed; and distribute a completion message to the computing devices associated with the individuals in the share group, wherein in response to receiving the completion message, the computing devices remove the task from their respective task list data structures.

11. The computer program product of claim 7, wherein generating the task entry comprises specifying at least one of task requirements, a description of the task to be performed, a category type for the task, required or preferred skills for individuals accepting the task, security levels of individuals that may accept the task, parent tasks associated with the task, child tasks associated with the task, a required completion time for the task, or a preferred completion time interval.

12. The computer program product of claim 7, wherein the data processing system is a server computing device that communicates with computing devices associated with the plurality of individuals in the share group.

13. An apparatus for sharing tasks between a plurality of individuals in a share group, comprising:

a processor; and a memory coupled to the processor, wherein the memory comprises instructions which, when executed by the processor, cause the processor to:

maintain a current task list data structure having task entries for tasks created by the user of the data processing system or shared with the user of the data processing system, wherein each task entry in the current task list data structure has a unique identifier;

receive a task message distributed to computing devices associated with the plurality of individuals, wherein the task message identifies a task to be shared among the plurality of individuals;

output an indicator of the task to a user of the data processing system requesting whether the user wishes to accept the task;

generate an acceptance message in response to the user accepting the task, wherein the acceptance message indicates the user's intent to complete the task;

generate a task entry for the accepted task in the current task list data structure;

distribute the acceptance message to computing devices associated with each of the plurality of individuals; and responsive to receiving a request from a computing device associated with an individual in the share group requesting that the user of the data processing system relinquish the task, relinquish the task back to the share group such that any individual in the share group may accept the task for completion.

14. The apparatus of claim 13, wherein the instructions further cause the processor to:

identify the share group comprising the plurality of individuals with which the task entry is to be shared; and distribute the task entry in association with the task message to the computing devices associated with individuals in the identified share group.

15. The apparatus of claim 13, wherein generating the task entry comprises specifying at least one of task requirements, a description of the task to be performed, a category type for the task, required or preferred skills for individuals accepting the task, security levels of individuals that may accept the task, parent tasks associated with the task, child tasks associated with the task, a required completion time for the task, or a preferred completion time interval.

16. The apparatus of claim 13, wherein the task message is a short message service (SMS) message that includes a sentinel sequence for specifying that the task message is to be processed by a task monitor process on each of the computing devices associated with individuals in the share group.

17. The apparatus of claim 13, wherein the instructions further cause the processor to:

receive a user input indicating that the task has been completed; and distribute a completion message to the computing devices associated with the individuals in the share group, wherein in response to receiving the completion message, the computing devices remove the task from their respective task list data structures.

\* \* \* \* \*